US007257401B1

(12) United States Patent
Dizdarevic et al.

(10) Patent No.: US 7,257,401 B1
(45) Date of Patent: *Aug. 14, 2007

(54) MESSAGING SERVICE FOR COMMUNICATIONS DEVICES

(75) Inventors: Jasminka Dizdarevic, Austin, TX (US); Simon James Richardson, Pflugerville, TX (US); Mark Wuthnow, Austin, TX (US); Jessie Lee, Austin, TX (US); Richard Man-keung Tam, Austin, TX (US)

(73) Assignee: Cingular Wireless II, LLC, Atlanta, GA (US)

( * ) Notice: Subject to any disclaimer, the term of this patent is extended or adjusted under 35 U.S.C. 154(b) by 310 days.

This patent is subject to a terminal disclaimer.

(21) Appl. No.: 10/624,213

(22) Filed: Jul. 22, 2003

Related U.S. Application Data (60) Provisional application No. 60/397,962, filed on Jul. 23, 2002.

(51) Int. Cl.
*H04Q 7/20* (2006.01)

(52) U.S. Cl. .................. 455/432.1; 455/445; 455/433; 455/466; 455/432.2

(58) Field of Classification Search ................ 455/466, 455/432.1, 433, 435.2, 435.3, 432.3
See application file for complete search history.

(56) References Cited

U.S. PATENT DOCUMENTS

| 6,625,461 | B1* | 9/2003 | Bertacchi | 455/466 |
|---|---|---|---|---|
| 6,650,909 | B1* | 11/2003 | Naqvi et al. | 455/560 |
| 6,681,115 | B1* | 1/2004 | McKenna et al. | 455/517 |
| 6,856,808 | B1* | 2/2005 | Comer et al. | 455/466 |
| 6,950,876 | B2* | 9/2005 | Bright et al. | 709/230 |
| 2002/0061745 | A1* | 5/2002 | Ahn et al. | 455/432 |
| 2002/0087674 | A1* | 7/2002 | Guilford | 709/223 |
| 2002/0094811 | A1* | 7/2002 | Bright et al. | 455/433 |
| 2002/0183081 | A1* | 12/2002 | Alvarez | 455/466 |
| 2003/0157938 | A1* | 8/2003 | Haase et al. | 455/445 |
| 2003/0186676 | A1* | 10/2003 | Ogman et al. | 455/403 |
| 2003/0224811 | A1* | 12/2003 | Jain et al. | 455/466 |
| 2004/0198291 | A1* | 10/2004 | Wilcox | 455/269 |

* cited by examiner

*Primary Examiner*—George Eng
*Assistant Examiner*—Huy Phan
(74) *Attorney, Agent, or Firm*—Parks Knowlton LLC; Paul E. Knowlton, Esq.; Coulter C. Henry, Jr.

(57) ABSTRACT

Methods and apparatuses are disclosed for delivering a message to a communications device. One method migrates a subscriber's communications device to a Global System for Mobile communications network. The subscriber's communications device is migrated from a Time Division Multiple Access communications network or a Code Division Multiple Access communications network. An origination request is received from the communications device, and the origination request is for sending the message from the communications device. The origination request includes a network address. The network address is associated to a signaling point code, and the signaling point code identifies a message service center in the Global System for Mobile communications network. The origination request is routed to the message service center in the Global System for Mobile communications network, wherein the origination request is processed by the message service center.

8 Claims, 10 Drawing Sheets

MESSAGING SERVICE FOR COMMUNICATIONS DEVICES

CROSS-REFERENCE TO PROVISIONAL APPLICATION

This patent claims the benefit of U.S. Provisional Patent Application No. 60/397,962, filed Jul. 23, 2002 and entitled "Method to Enable the SMS Service for the Subscribers Converted From GAIT TDMA Native to GAIT GSM Native," and this provisional patent application is incorporated herein by reference in its entirety.

NOTICE OF COPYRIGHT PROTECTION

A portion of the disclosure of this patent document and its figure contain material subject to copyright protection. The copyright owner has no objection to the facsimile reproduction by anyone of the patent document or the patent disclosure, but otherwise reserves all copyrights whatsoever.

CROSS-REFERENCE TO RELATED APPLICATION

This patent also relates to the commonly-assigned U.S. patent (application No. 10/624,401, filed Jul. 22, 2003,) entitled "Registration of Communications Devices (docket number C02-0053-000), of which the "Brief Summary of the Invention" and the "Detailed Description of the Invention" sections are incorporated herein by reference.

BACKGROUND OF THE INVENTION

1. Field of the Invention

This invention generally relates to mobile communications and, more particularly, to methods for delivering messages to and from a migrated communications device.

2. Description of the Related Art

Migration of subscribers is a concern for mobile telecommunications service providers. Sometimes a telecommunications service provider will move, or "migrate," a subscriber from one network standard to another network standard. The subscriber, for example, may be migrated from a TDMA/CDMA communications network to a GSM communications network. Before the subscriber is migrated, however, network provisioning is a concern. The GSM/TDMA/CDMA communications networks must be re-provisioned to correctly locate and access subscriber information that is required to process communications (e.g., calls, messaging, content delivery, etc.). If the GSM/TDMA/CDMA communications network is not re-provisioned to correctly find the subscriber's information, the subscriber may be prevented from sending and/or from receiving communications.

Messaging service is an example. Some subscribers may send and receive messages at their communications device. These messages are composed of alphanumeric characters and are presented on a display of the subscriber's communications device. Before a message can be delivered, however, the communications network must access the subscriber information that is required to process the message. The communications network, for example, must determine which message service center, and which Home Location Register, is associated with the subscriber. The communications network must also exchange status messages when processing the message. When the subscriber is migrated from one network standard to another network standard, a new message service center and a new Home Location Register are associated with the subscriber. If, however, the communications network continues routing messages to the old message service center and to the old Home Location Register, the messages will fail—that is, the messages are not delivered to the communications device. The communications network, then, must be re-provisioned to continue correctly delivering messages to the subscriber.

There is, accordingly, a need in the art for an improved messaging service for mobile communications subscribers, a need for improved methods of routing messages to and from a communications device, and a need for improved methods of migrating subscribers from one network standard to another network standard.

BRIEF SUMMARY OF THE INVENTION

The aforementioned problems, and other problems, are reduced by methods for delivering a message to/from a communications device. The methods of this invention, however, are especially useful for migrated subscribers. When a subscriber is migrated from a Time Division Multiple Access (TDMA) communications network, or from a Code Division Multiple Access (CDMA) communications network, to a Global System for Mobile (GSM) communications network, network routing parameters must be changed. This invention, then, uses various mappings, cross-referencing, and/or associating techniques to route the message between communications networks of different signaling standards. The techniques discussed in this patent allow a migrated subscriber's communications device to send, or "originate," and to receive, or "terminate," messages regardless of whether the communications device is operating in a GSM communications network, a TDMA communications network, or a CDMA communications network. Thus, the subscriber has access to messaging service from any TDMA, CDMA, and/or GSM communications network.

This invention discloses methods for delivering a message to a communications device. One method migrates a subscriber's communications device to a Global System for Mobile communications network. The subscriber's communications device is migrated from a Time Division Multiple Access communications network or a Code Division Multiple Access communications network. An origination request is received from the communications device, and the origination request is for sending the message from the communications device. The origination request includes a network address. The network address is associated to a signaling point code, and the signaling point code identifies a message service center in the Global System for Mobile communications network. The origination request is routed to the message service center in the Global System for Mobile communications network, wherein the origination request is processed by the message service center.

Another embodiment of this invention describes another method for delivering a message to a communications device. Here an origination request is received at a mobile switching center. The mobile switching center operates within either a Time Division Multiple Access communications network or a Code Division Multiple Access communications network. The origination request is for sending a message from the communications device, and the origination request includes a network address of a message service center associated with the communications device. The origination request is routed to the message service center in a Global System for Mobile communications network, wherein the origination request is processed by the message service center, thus allowing the message to be sent from the communications device.

Another embodiment of this invention describes yet another method for delivering a message to a communications device. The message is received at a message service center, and the message is to terminate at the communications device. If the communications device operates using a Global System for Mobile communications signaling standard, then the message is routed to a GSM Home Location Register operating in a Global System for Mobile communications network. The routing of the message to the GSM Home Location Register uses global title translation for a Mobile Station Integrated Services Digital Network associated with the communications device. If, however, the communications device operates using a GSM-ANSI Interoperability Team signaling standard, then the message is routed to a TDMA Home Location Register in a Time Division Multiple Access communications network. The routing of the message to the TDMA Home Location Register uses global title translation for a Mobile Subscriber Identification Number associated with the communications device. The message is then processed for termination at the communications device.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention provides methods for delivering communications (e.g., call, message, graphics, etc.) to/from a communications device. The methods of this invention, however, are especially useful for delivering messages of migrated subscribers. When a subscriber is migrated from a Time Division Multiple Access (TDMA) communications network, or alternatively from a Code Division Multiple Access (CDMA) communications network, to a Global System for Mobile (GSM) communications network, network routing parameters must be changed. This invention, then, uses various mappings, cross-referencing, and/or associating techniques to route the message between communications networks of different signaling standards. The techniques discussed in this patent allow a migrated subscriber's communications device to send, or "originate," and to receive, or "terminate," messages regardless of whether the communications device is operating in a GSM communications network, a TDMA communications network, and/or a CDMA communications network. Thus, the subscriber has access to messaging service from any TDMA, CDMA, and/or GSM communications network.

Figure 1:
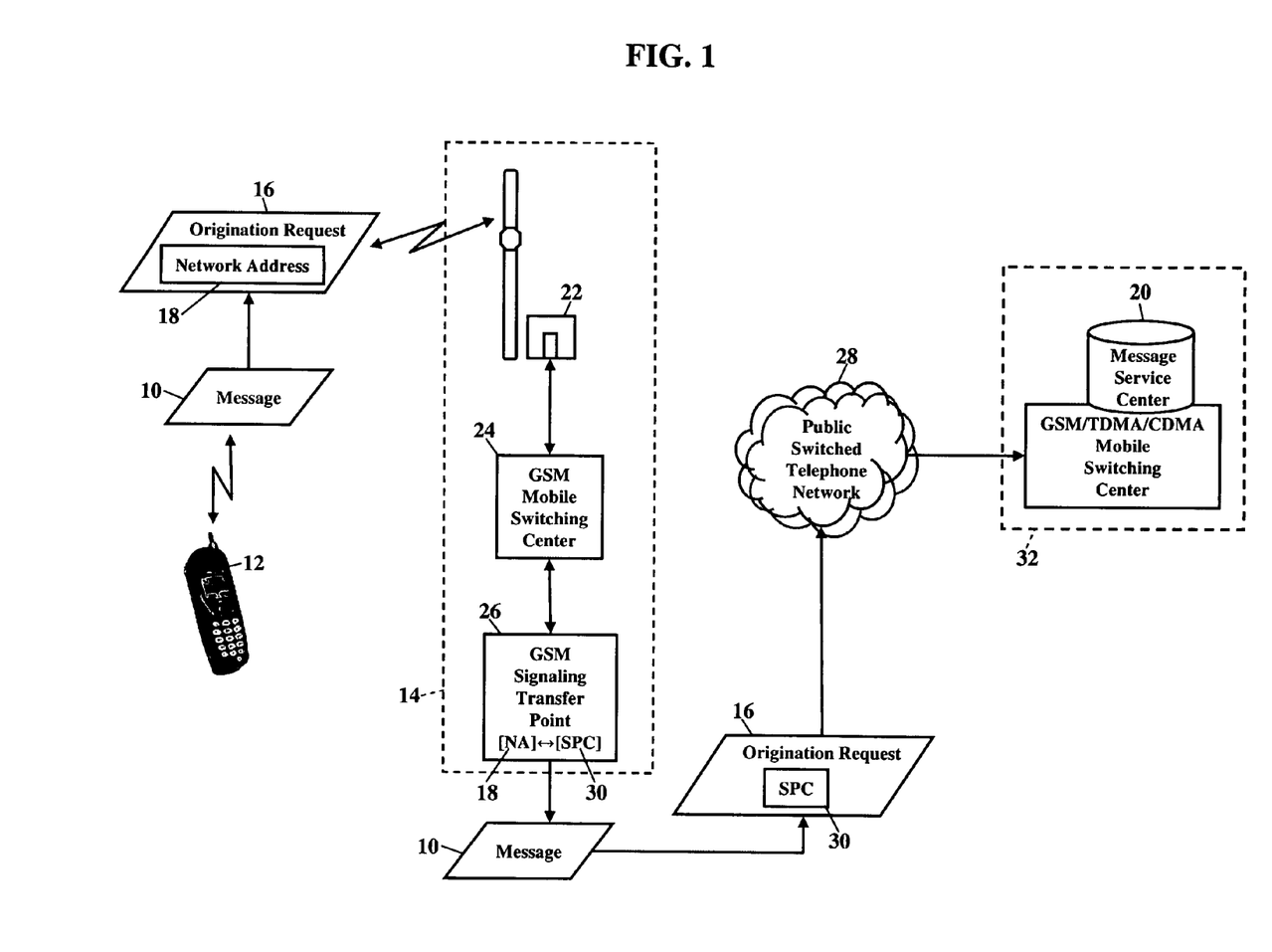
FIG. 1 is a block diagram illustrating an embodiment of this invention for originating a message from a communications device.

FIG. 1 is a block diagram illustrating an embodiment of this invention. FIG. 1 illustrates the "origination" of a message 10—that is, the message 10 originates from a communications device 12. Although the communications device 12 is shown as a mobile terminal (or sometimes called a "mobile station" or "mobile equipment"), the communications device 12 could encompass a personal data assistant (PDA), a computer, a camera, a digital music device, or any other device that sends/receives communications signals. The message 10 is received by a communications network 14. The message 10 may have any format and content, although the message 10 is typically formatted as a "short message service." As those of ordinary skill in the art recognize, the "short message service" is a single, non-voice message. Because messaging services are well known in the art, this patent will only very generally discuss the flow of the message 10 from the communications device 12. If the reader desires more information on messaging services, the reader is directed to the following sources: SIEGMUND REDL et al., GSM AND PERSONAL COMMUNICATIONS HANDBOOK 211-43 (1998); JÖRG EBERSPÄCHER et al., GSM SWITCHING, SERVICES AND PROTOCOLS 142-44 (2001); and LAWRENCE HARTE et al., GSM SUPERPHONES 164-67, 185-86 & 264-68 (1999), with each incorporated herein by reference.

As FIG. 1 shows, the message 10 is preceded by an origination request 16. The origination request 16 is communicated from the communications device 12, and the origination request 16 alerts the communications network 14 that the communications device 12 is attempting to send, or originate, the message 10. The origination request 16 includes a network address 18 of a message service center 20 serving the communications device 12. The message 10, preceded by the origination request 18, is received by a base station 22, forwarded to a mobile switching center 24, and then forwarded to a Signaling Transfer Point 26. The Signaling Transfer Point 26 then forwards the message 10 to the message service center 20.

The Signaling Transfer Point 26, however, must locate the message service center 20. Although the origination request 16 includes the network address 18 of the message service center 20, this network address 18 is sometimes in a different format than that required by the Signaling Transfer Point 26. The Signaling Transfer Point 26, in this embodiment, uses a Signaling Point Code (SPC) to locate the message service center 20. As those of ordinary skill in the art understand, the Signaling Point Code is a unique code that is assigned to each node in a Signaling System 7 (SS7) network. A Public Switched Telephone Network 28, for example, uses SS7 to set-up, route, and/or manage communications. Because the network address 18 is sometimes in a different format, the Signaling Transfer Point 26 maps, cross-references, and/or associates the network address (NA) 18 to a Signaling Point Code (SPC) 30. The Signaling Point Code 30 identifies the message service center 20. Now that the Signaling Transfer Point 26 knows the Signaling Point Code 30 of the message service center 20, the origination request 16 and the message 10 are routed to the message service center 20 via the Public Switched Telephone Network 28. The message service center 20 then processes the origination request 16 and the message 10 for delivery to the recipient (not shown for simplicity).

As FIG. 1 shows, the message service center 20 operates in a communications network 32. The message service center 20, for example, may operate in either a Global System for Mobile (GSM) communications network, a Time Division Multiple Access (TDMA) communications network, and/or in a Code Division Multiple Access (CDMA) communications network. That is, the message service center 20 operates according to either the GSM signaling standard, the TDMA signaling standard, or the CDMA signaling standard. The methods of this invention, then, allow the message 10, and the origination request 16, to be sent regardless of the signaling standard. As this patent explains, this invention uses various mappings, cross-referencing, and/or associating techniques to route the message 10, and the origination request 16, between communications networks of different signaling standards.

Figure 2:
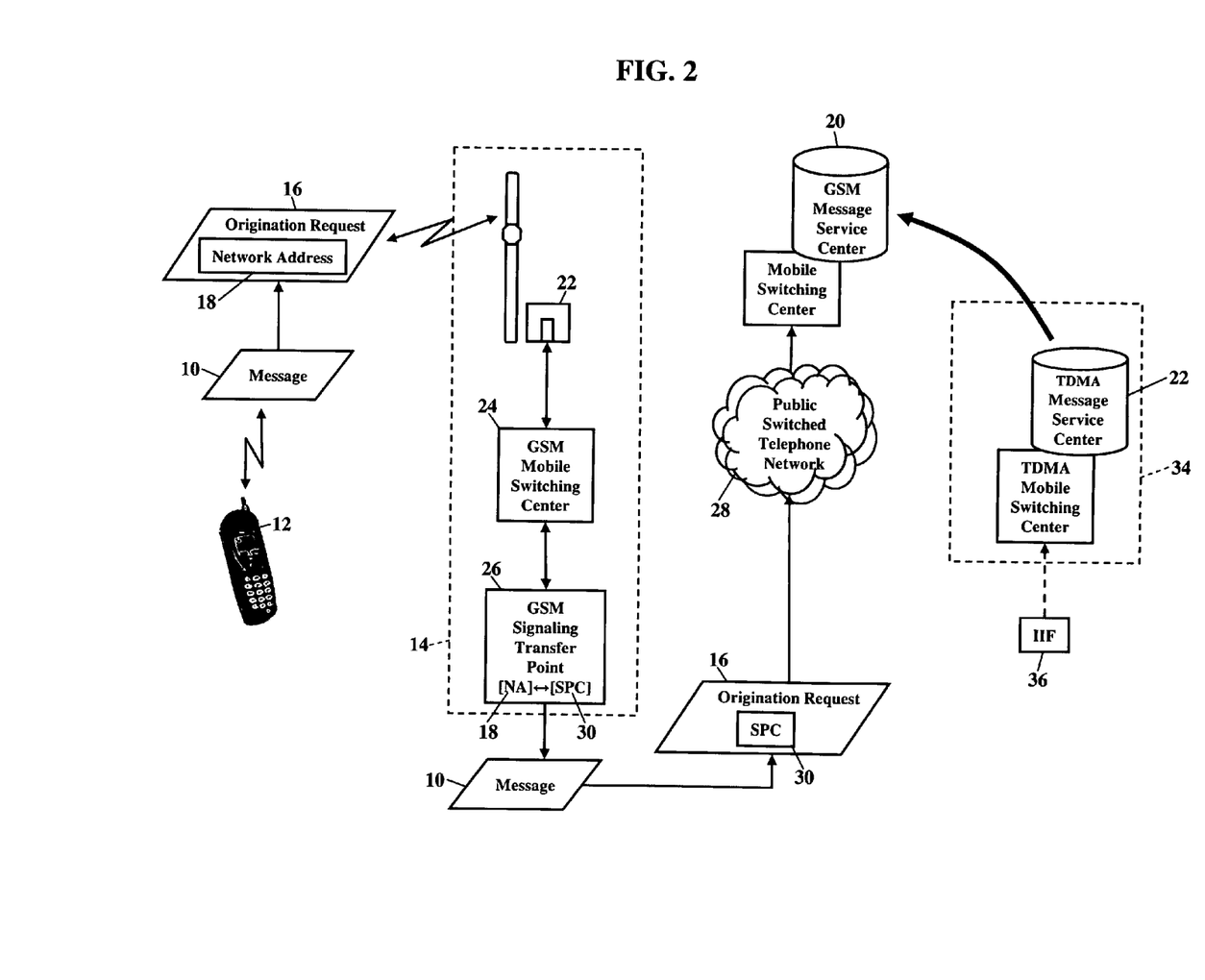
FIG. 2 is a block diagram illustrating another embodiment of this invention for originating a message from a communications device of a migrated subscriber.

FIG. 2 is a block diagram illustrating another embodiment of this invention. FIG. 2 shows how the methods of this invention may be used when a subscriber is "migrated" from a Time Division Multiple Access (TDMA) communications network 34 to the Global System for Mobile (GSM) communications network 14. The subscriber's communications device 12, in this embodiment, is a "dual-mode" GSM-ANSI Interoperability Team (GAIT) device that can operate in both the Global System for Mobile communications network 14 and in the Time Division Multiple Access communications network 34. When, however, the subscriber is moved, or "migrated," from the Time Division Multiple Access communications network 34 to the Global System for Mobile communications network 14, network routing must be modified. Prior to migration, the GAIT subscriber's message 10 was routed from the Signaling Transfer Point 26 to an Interworking and Interoperability Function (IIF) 36. The Interworking and Interoperability Function 36 provided a signaling interface between the Global System for Mobile communications network 14 and the Time Division Multiple Access communications network 34. If the subscriber was "native" to the Time Division Multiple Access communications network 34 (that is, the subscriber's communications device 12 was activated in the Time Division Multiple Access communications network 34), but the communications device 12 was operating in the "foreign" Global System for Mobile communications network 14, the message 10 and the origination request 16 were routed to the Interworking and Interoperability Function 36. The Interworking and Interoperability Function 36 enabled messaging service access when the subscriber operated in the "foreign" Global System for Mobile communications network 14.

After migration, however, the subscriber is now "native" to the Global System for Mobile communications network 14. When the Signaling Transfer Point 26 receives the origination request 16 and the message 10, the Signaling Transfer Point 26 should directly route to the message service center 20. The signaling interface provided by the Interworking and Interoperability Function 36 is not required. The routing at the Signaling Transfer Point 26, therefore, is changed so that the network address 18 (provided by the communications device 12) is mapped, cross-referenced, and/or associated to the Signaling Point Code (SPC) 28 of the message service center 20. The Signaling Transfer Point 26 then directly routes the origination request 16 and the message 10 to the message service center 20 via the Public Switched Telephone Network 28. The message service center 20 then processes the origination request 16 and the message 10 for delivery to the recipient (again not shown for simplicity).

Figure 3:
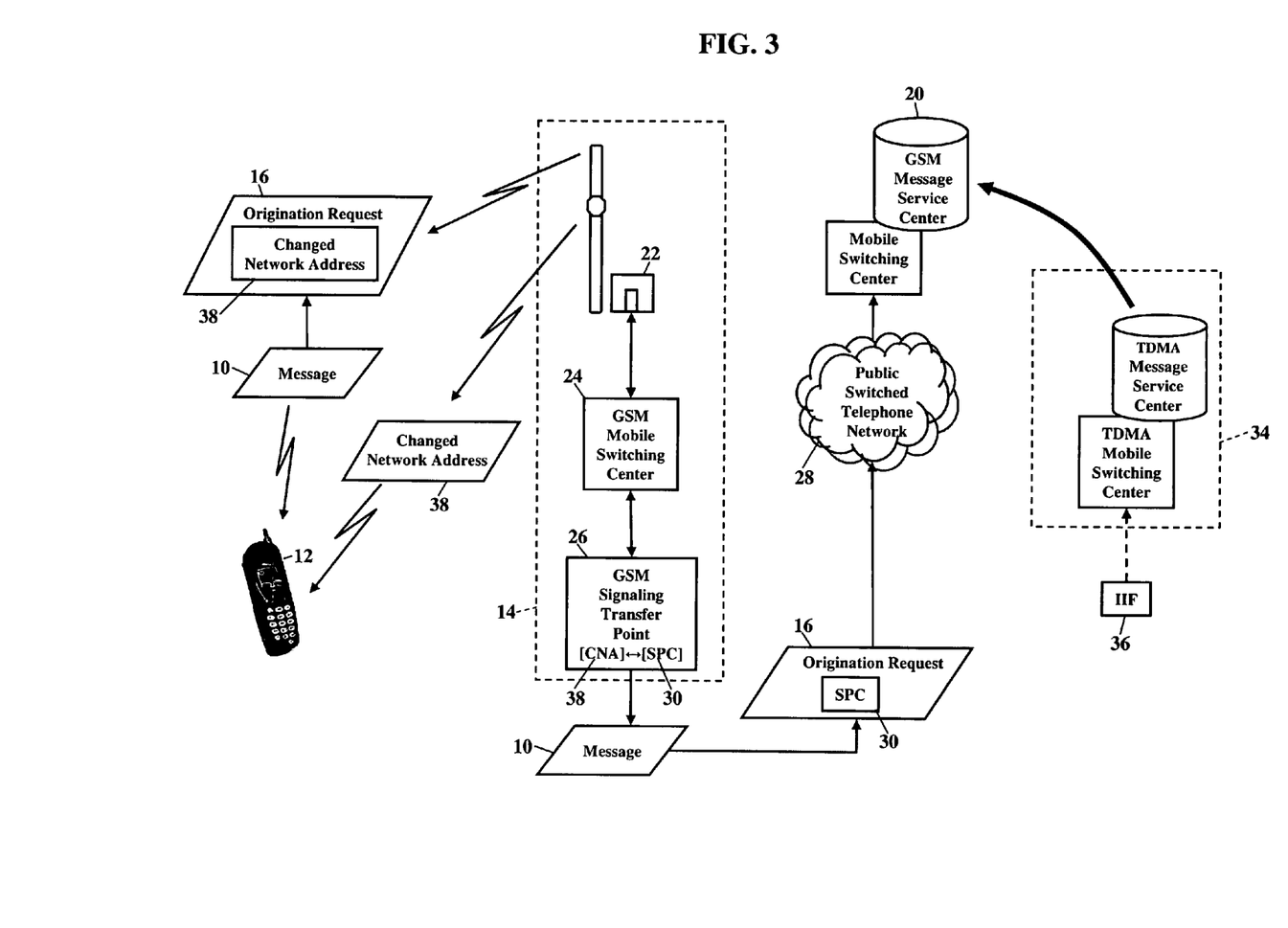
FIGS. 3 and 4 are block diagrams illustrating another embodiment of this invention for originating a message from a communications device of a migrated subscriber.
Figure 4:
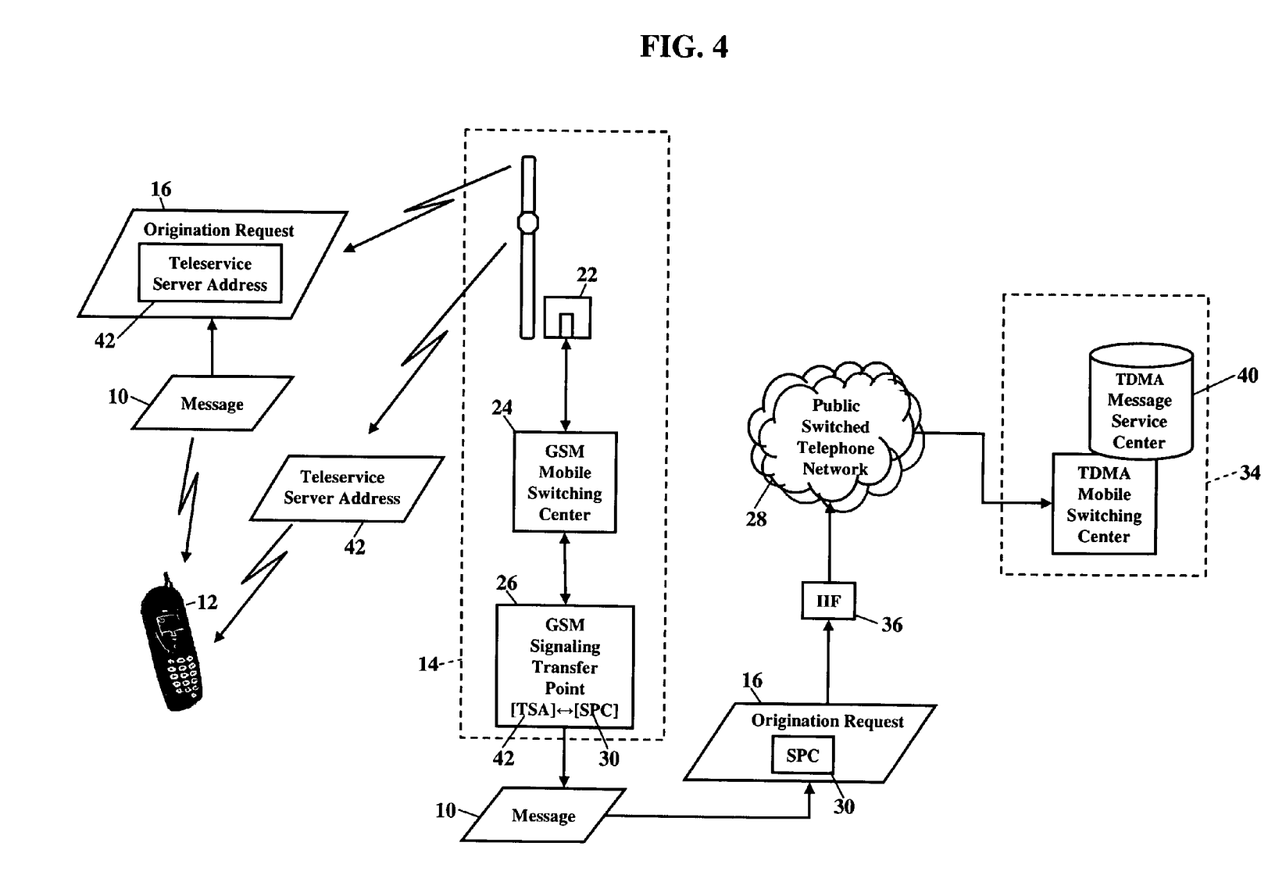

FIGS. 3 and 4 are block diagrams illustrating another embodiment of this invention. FIGS. 3 and 4 again show how the methods of this invention may be used when a subscriber is migrated from the Time Division Multiple Access (TDMA) communications network 34 to the Global System for Mobile (GSM) communications network 14. Here, however, only certain subscribers are migrated, so the routing for non-migrated GAIT subscribers must remain unchanged. FIG. 3, then, is a message flow diagram when the subscriber has been migrated to the Global System for Mobile communications network 14, while FIG. 4 is a message flow diagram when the subscriber remains native to the Time Division Multiple Access communications network 34.

When a subscriber is migrated, the subscriber's communications device 12 is reprogrammed. As FIG. 3 shows, the subscriber's communications device 12 is reprogrammed to provide a updated network address 38. This updated network address 38 identifies the migrated message service center 20 serving the migrated communications device 12. The migrated subscriber's communications device 12 may be reprogrammed using any means, however, the communications device 12 is preferably wirelessly reprogrammed after migration. As those of ordinary skill in the art recognize, many features of the communications device 12 may be reprogrammed "over the air." A telecommunications service provider way wirelessly update the network address (shown as reference numeral 18 in FIGS. 1 and 2), such that the communications device 12 now provides the updated network address 38. When the Signaling Transfer Point 26 receives the origination request 16, the origination request 16 now includes the updated network address 38. The Signaling Transfer Point 26 is then provisioned to map, cross-reference, and/or associate the updated network address (UNA) 38 to the Signaling Point Code (SPC) 30 that identifies the message service center 20. The Signaling Transfer Point 26 then directly routes the origination request 16 and the message 10 to the message service center 20 via the Public Switched Telephone Network 28. The message service center 20 then processes the origination request 16 and the message 10 for delivery to the recipient (again not shown for simplicity).

FIG. 4 is a message flow diagram when the subscriber remains native to the Time Division Multiple Access communications network 34. Because the subscriber is operating within the Global System for Mobile communications network 14, the subscriber's GAIT communications device 12 operates in the GSM foreign mode. The Signaling Transfer Point 26, therefore, must route the message 10 (and the origination request 16) to the Interworking and Interoperability Function 36. The Interworking and Interoperability Function 36 provides the signaling interface between the Global System for Mobile communications network 14 and the Time Division Multiple Access communications network 36. The Interworking and Interoperability Function 36 then routes the message 10, and the origination request 16, to a TDMA message service center 40 operating in the Time Division Multiple Access communications network 34.

This invention, then, updates a Teleservice Server Address 42 provided by the GAIT communications device 12. As those of ordinary skill in the art understand, the Teleservice Server Address 42 identifies the address of the message service center serving the subscriber. This invention, then, updates the Teleservice Server Address 42 for those subscribers who remain native to the Time Division Multiple Access communications network 34. The communications device 12, as mentioned before, may be reprogrammed using any means, however, this invention preferably wirelessly reprograms the Teleservice Server Address 42 to identify the TDMA message service center 40. When the Signaling Transfer Point 26 receives the origination request 16, the origination request 16 now includes the Teleservice Server Address 42. The Signaling Transfer Point 26 is then provisioned to map, cross-reference, and/or associate the Teleservice Server Address (TSA) 42 to the Signaling Point Code (SPC) 30 that identifies the Interworking and Interoperability Function 36. The Signaling Transfer Point 26 then directly routes the origination request 16 and the message 10 to the Interworking and Interoperability Function 36. The Interworking and Interoperability Function 36 then routes the origination request 16 and the message 10 to the TDMA message service center 40 via the Public Switched Telephone Network 28. The TDMA message service center 40 then processes the origination request 16 and the message 10 for delivery to the recipient (again not shown for simplicity).

Figure 5:
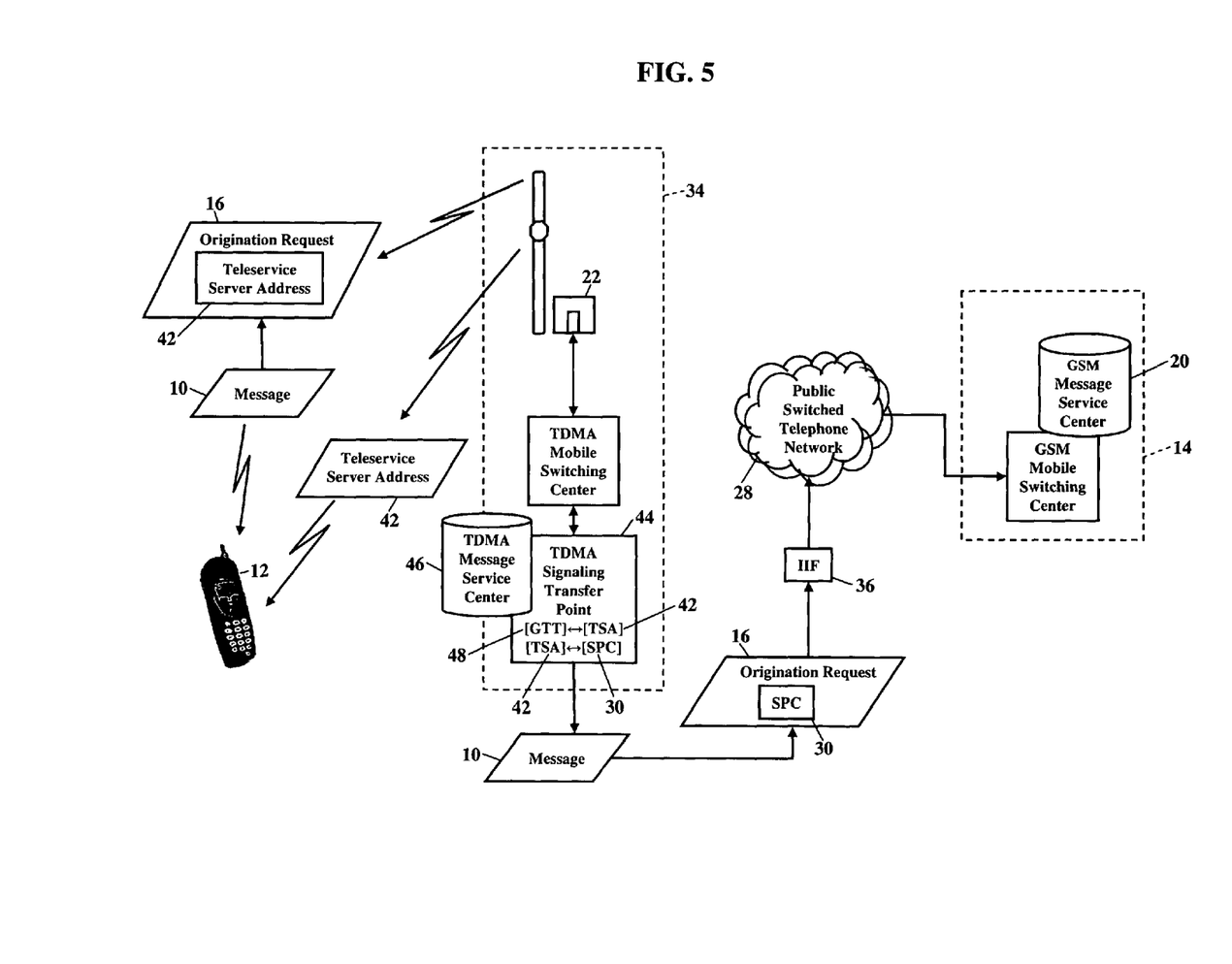
FIG. 5 is a schematic showing still another embodiment of this invention for originating a message from a communications device of a migrated subscriber.

FIG. 5 is a schematic showing still another embodiment of this invention. FIG. 5 again shows how the methods of this invention may be used to migrate a subscriber from the Time Division Multiple Access (TDMA) communications network 34 to the Global System for Mobile (GSM) communications network 14. Here, however, FIG. 5 shows the subscriber's GAIT communications device 12 operating in a TDMA "foreign" mode. The subscriber's GAIT communications device 12, in other words, has been migrated to the Global System for Mobile (GSM) communications network 14; however, the communications device 12 is originating the message 10 from the Time Division Multiple Access (TDMA) communications network 34. Because the subscriber's GAIT communications device 12 has been migrated to the Global System for Mobile communications network 14, the routing within the Time Division Multiple Access communications network 34 must be changed. A TDMA Signaling Transfer Point 44, in particular, must no longer route the origination request 16, and the message 10, to a TDMA message service center 46. After the subscriber's GAIT communications device 12 has been migrated, the TDMA Signaling Transfer Point 44, instead, must locate the GSM message service center 20 operating in the Global System for Mobile communications network 14.

This embodiment, then, routes to the Interworking and Interoperability Function 36. The Teleservice Server Address 42, provided by the GAIT communications device 12, is reprogrammed to identify the GSM message service center 20. The Teleservice Server Address 42 may be reprogrammed using any means, however, this invention preferably wirelessly reprograms the Teleservice Server Address 42 "over the air." When the TDMA Signaling Transfer Point 44 receives the origination request 16, the origination request 16 now includes the reprogrammed Teleservice Server Address 42. The TDMA Signaling Transfer Point 44 is then provisioned to use Global Title Translation (GTT) 48 on the reprogrammed Teleservice Server Address 42. The TDMA Signaling Transfer Point 44 then maps, cross-references, and/or associates the reprogrammed Teleservice Server Address (TSA) 42 to the Signaling Point Code (SPC) 30 that identifies the Interworking and Interoperability Function 36. The TDMA Signaling Transfer Point 44 then directly routes the origination request 16 and the message 10 to the Interworking and Interoperability Function 36. The Interworking and Interoperability Function 36 then routes the origination request 16 and the message 10 to the GSM message service center 20 via the Public Switched Telephone Network 28. The GSM message service center 20 then processes the origination request 16 and the message 10 for delivery to the recipient (not shown for simplicity).

Figure 6:
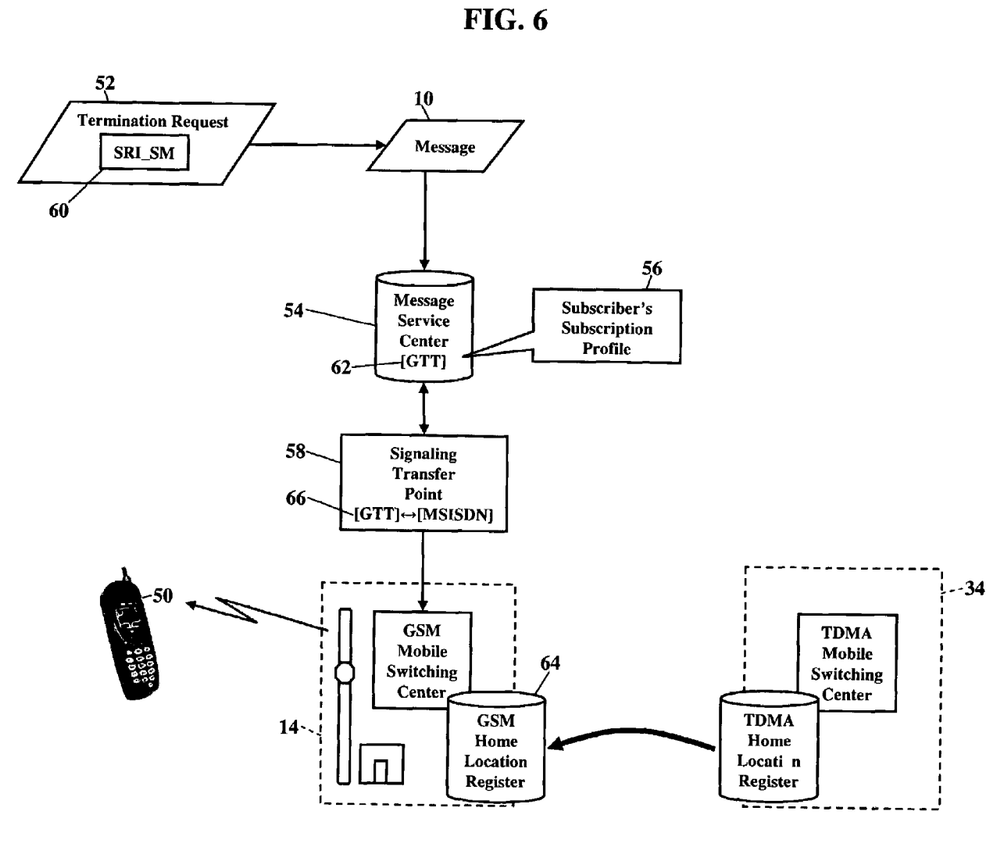
FIGS. 6 and 7 are schematics showing yet another embodiment of this invention when delivering, or "terminating," a message to a migrated recipient's communications device.
Figure 7:
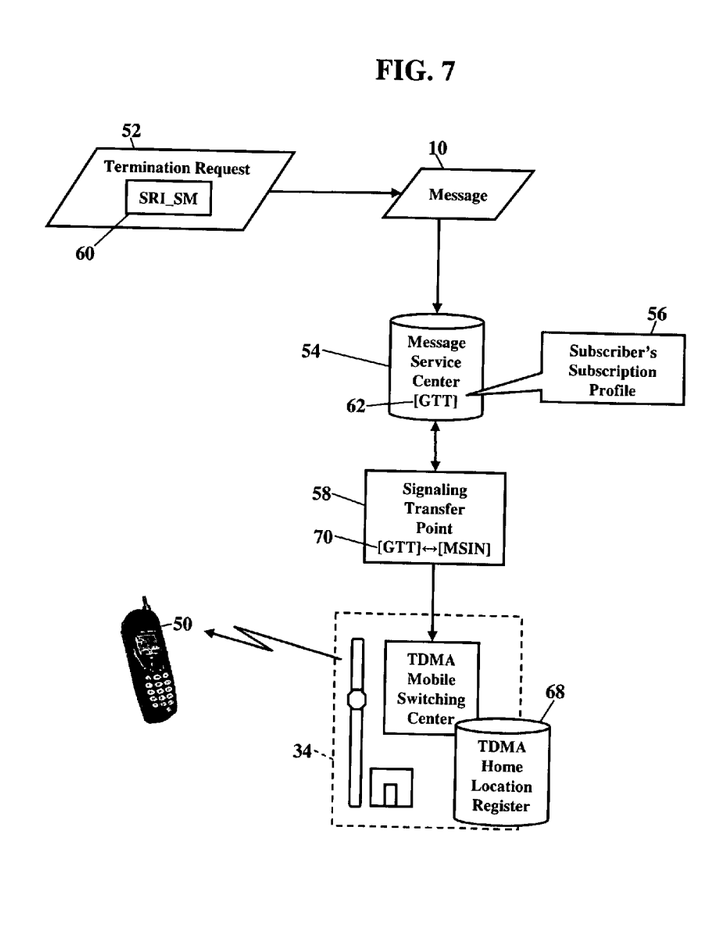

FIGS. 6 and 7 are schematics showing yet another embodiment of this invention. FIGS. 6 and 7 show how this invention may be used to deliver, or "terminate," the message 10 to a recipient's communications device 50. The recipient's communications device 50 is again a "dual-mode" GSM-ANSI Interoperability Team (GAIT) device that can operate in both the Global System for Mobile communications network 14 and in the Time Division Multiple Access communications network 34. FIG. 6 shows how the message is routed when the recipient's communications device 50 has been migrated from the Time Division Multiple Access (TDMA) communications network 34 to the Global System for Mobile (GSM) communications network 14. FIG. 7, on the other hand, illustrates how the message is routed when the recipient's communications device 50 remains native to the Time Division Multiple Access communications network 34.

When the recipient's communications device 50 is migrated, the routing of messages must change. After the recipient's communications device 50 is migrated, the existing routing settings, and the existing Terminal Type setting assigned to the recipient's communications device 50 in the message service centers, will not support delivery of the message 10. Before the recipient was migrated, messages were routed to a TDMA Home Location Register operating in the Time Division Multiple Access communications network. After the recipient is migrated, however, message termination requests should be routed to a GSM Home Location Register 64 operating in the Global System for Mobile communications network 14. If, however, the recipient is not migrated, then message termination requests should continue to be routed to the TDMA Home Location Register operating in the Time Division Multiple Access communications network.

FIG. 6, then, is a message flow diagram after migration. Here, again, the recipient's communications device 50 has been migrated from the Time Division Multiple Access communications network 34 to the Global System for Mobile (GSM) communications network 14. As FIG. 6 shows, the message 10, and a termination request 52, is received at a message service center 54. The message 10 is to terminate at the recipient's communications device 50. The message service center 54 validates the recipient's communications device 50, and the message service center 54 determines the "Terminal Type" of the recipient's communications device 50. Because the recipient's communications device 50 has been migrated from the Time Division Multiple Access communications network 34 to the Global System for Mobile communications network 14, the message service center 54 determines that the "Terminal Type" is "GSM." That is, a subscription profile 56 associated with the recipient's communications device 50 has been re-provisioned in the message service center 54 with the "Terminal Type" set to "GSM." Because the "Terminal Type" is "GSM," the message service center 54 routes the message 10, and the termination request 52, to a Signaling Transfer Point 58. The termination request 52, in particular, may include an "SRI_SM" ("Send Routing Information for Short Messaging") message 60. The message service center 54 uses Global Title Translation (GTT) 62 to route the "SRI_SM" message 60 to the Signaling Transfer Point 58.

The Signaling Transfer Point 58 the routes to an appropriate GSM Home Location Register 64. The Signaling Transfer Point 58 must determine what Home Location Register is associated with the recipient's communications device 50. The Signaling Transfer Point 58 is provisioned to perform Mobile Station Integrated Services Digital Network-based (MSISDN-based) routing. As those of ordinary skill in the art understand, the recipient's communications device 50 is associated with a Mobile Station Integrated Services Digital Network number. The Signaling Transfer Point 58 thus performs MSISDN-based Global Title Translation (GTT) 66 and routes the "SRI_SM" message 60 to the GSM Home Location Register 64 in the Global System for Mobile communications network 14. The GSM Home Location Register 64 then processes the message 10, and the termination request 52, for termination at the recipient's communications device 50.

FIG. 7 is a message flow diagram when the recipient's communications device 50 remains native to the Time Division Multiple Access communications network 34. Here the recipient's communications device 50 was not migrated to the Global System for Mobile communications network (shown as reference numeral 14 in FIGS. 1-6). As FIG. 7 shows, the message service center 54 receives the message 10 and the termination request 52. The message service center 54, as before, validates the recipient's communications device 50 and determines the "Terminal Type" of the recipient's communications device 50. Here, however, the recipient's communications device 50 did not migrate. The subscription profile 56 associated with the recipient's communications device 50, then, remains provisioned in the message service center 54 with the "Terminal Type" set to "GAIT." Because the "Terminal Type" is "GAIT," the message service center 54 uses Global Title Translation (GTT) 62 to route the "SRI_SM" message 60 to the Signaling Transfer Point 58.

The Signaling Transfer Point 58 then routes to an appropriate TDMA Home Location Register 68. The Signaling Transfer Point 58 must determine what Home Location Register, in the Time Division Multiple Access communications network 34, is associated with the recipient's communications device 50. Here, then, the Signaling Transfer Point 58 is provisioned to perform Mobile Station Identification Number-based (MSIN-based) routing. As those of ordinary skill in the art recognize, each GSM subscriber is assigned a Mobile Station Identification Number (MSIN). The Mobile Station Identification Number identifies the subscriber within that subscriber's home mobile network. The Signaling Transfer Point 58 thus performs MSIN-based Global Title Translation (GTT) 70 and routes the "SRI_SM" message 60 to the TDMA Home Location Register 68 in the Time Division Multiple Access (TDMA) communications network 34. The TDMA Home Location Register 68 then processes the message 10, and the termination request 52, for termination at the recipient's communications device 50.

Figure 8:
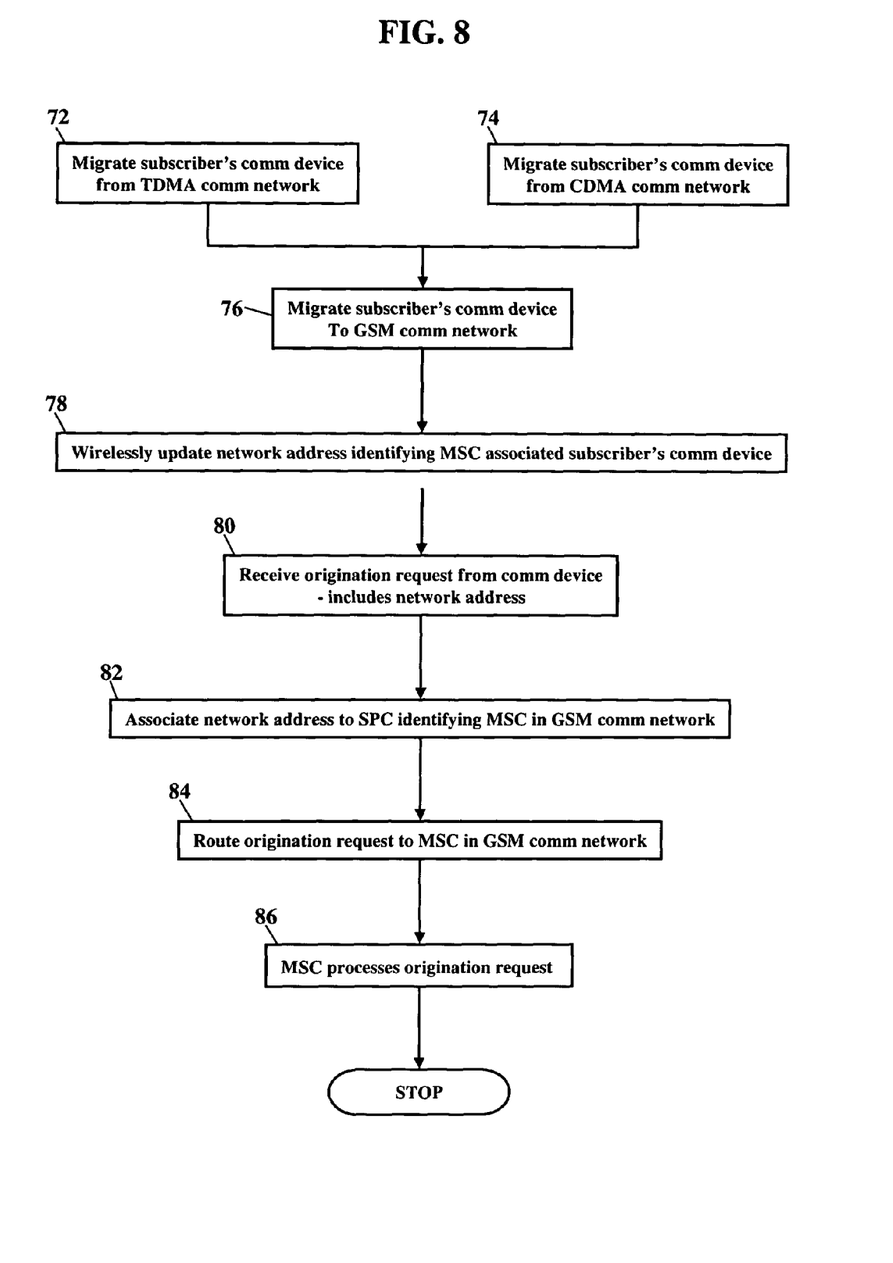
FIG. 8 is a flowchart illustrating a method for delivering a message to a communications device.

FIG. 8 is a flowchart illustrating a method for delivering a message to a communications device. A subscriber's communications ("comm.") device is migrated from a Time Division Multiple Access (TDMA) communications network (Block 72) or from a Code Division Multiple Access (CDMA) communications network (Block 74). The subscriber's communications device is migrated to a Global System for Mobile (GSM) communications network (Block 76). After the subscriber's communications device is migrated, a network address is wirelessly updated (Block 78). The network address identifies a message service center (MSC) associated with the subscriber's communications device. An origination request is received from the communications device (Block 80). The origination request is for sending a message from the communications device, and the origination request includes the network address. The network address is next associated to a signaling point code (SPC) identifying a message service center (MSC) in the Global System for Mobile (GSM) communications network (Block 82). The origination request is then routed (Block 84) to the message service center operating in the Global System for Mobile communications network. The message service center then processes the origination request (Block 86).

Figure 9:
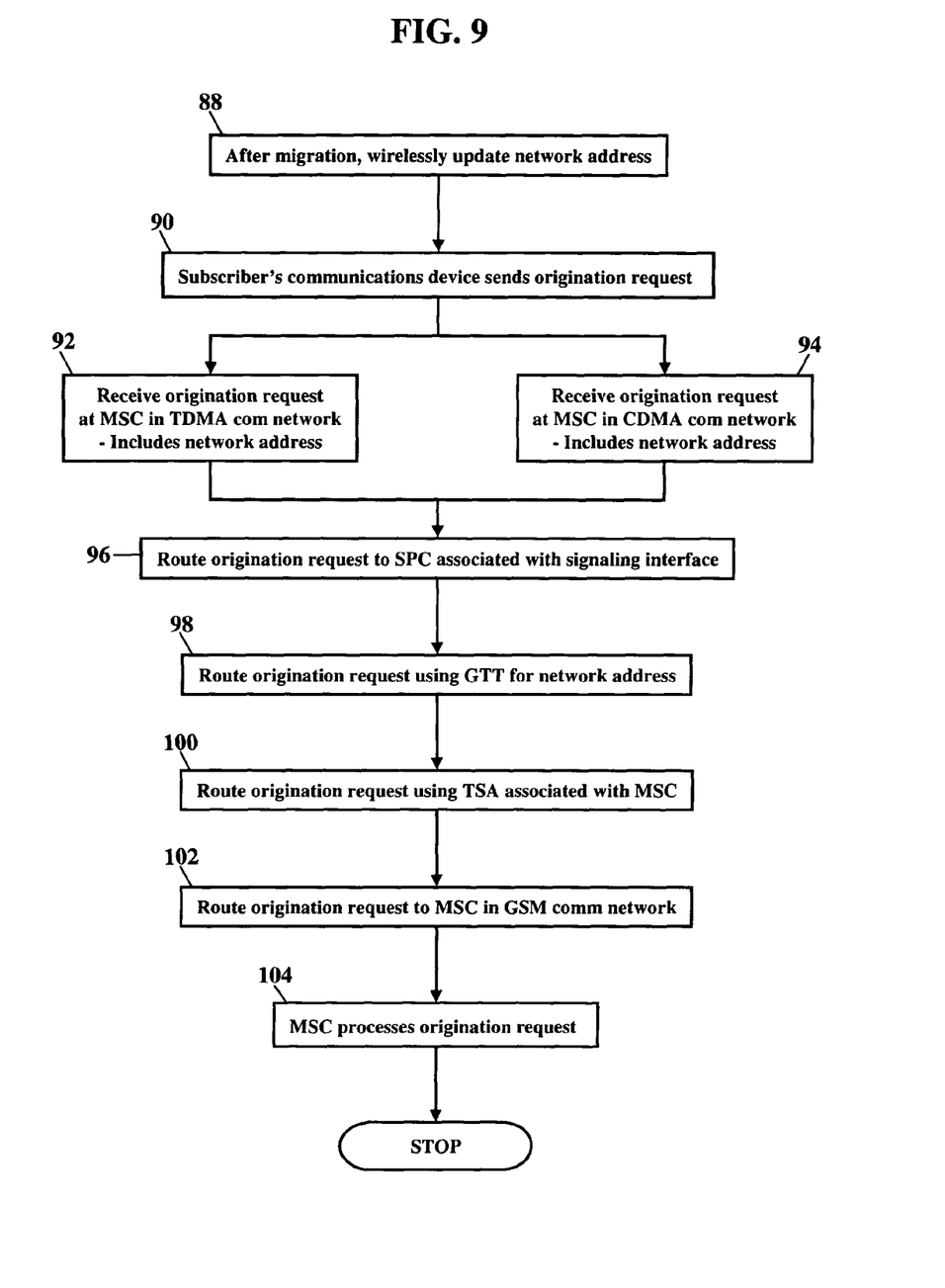
FIG. 9 is a flowchart illustrating another method for delivering a message to a communications device.

FIG. 9 is a flowchart illustrating another method for delivering a message to a communications device. After a subscriber's communications device is migrated, a network address is wirelessly updated (Block 88). The network address identifies a message service center (MSC) associated with the subscriber's communications device. When the subscriber wishes to send a message, the subscriber's communications device sends an origination request (Block 90). The origination request is received at a mobile switching center (MSC) in either a Time Division Multiple Access (TDMA) communications network (Block 92) or a Code Division Multiple Access (CDMA) communications network (Block 94). The origination request is for sending a message from a communications device, and the origination request includes a network address of a message service center associated with the communications device. The origination request may be routed to a Signaling Point Code (SPC) associated with a signaling interface (Block 96) between the Global System for Mobile communications network and either the Time Division Multiple Access communications network or the Code Division Multiple Access communications network. The origination request may also be routed using Global Title Translation (GTT) for the network address (Block 98). The origination request may also be routed using a Teleservice Server Address (TSA) associated with the message service center (Block 100). The origination request is routed to the message service center in a Global System for Mobile communications network (Block 102). The message service center processes the origination request (Block 104), thus allowing the message to be sent from the communications device.

Figure 10:
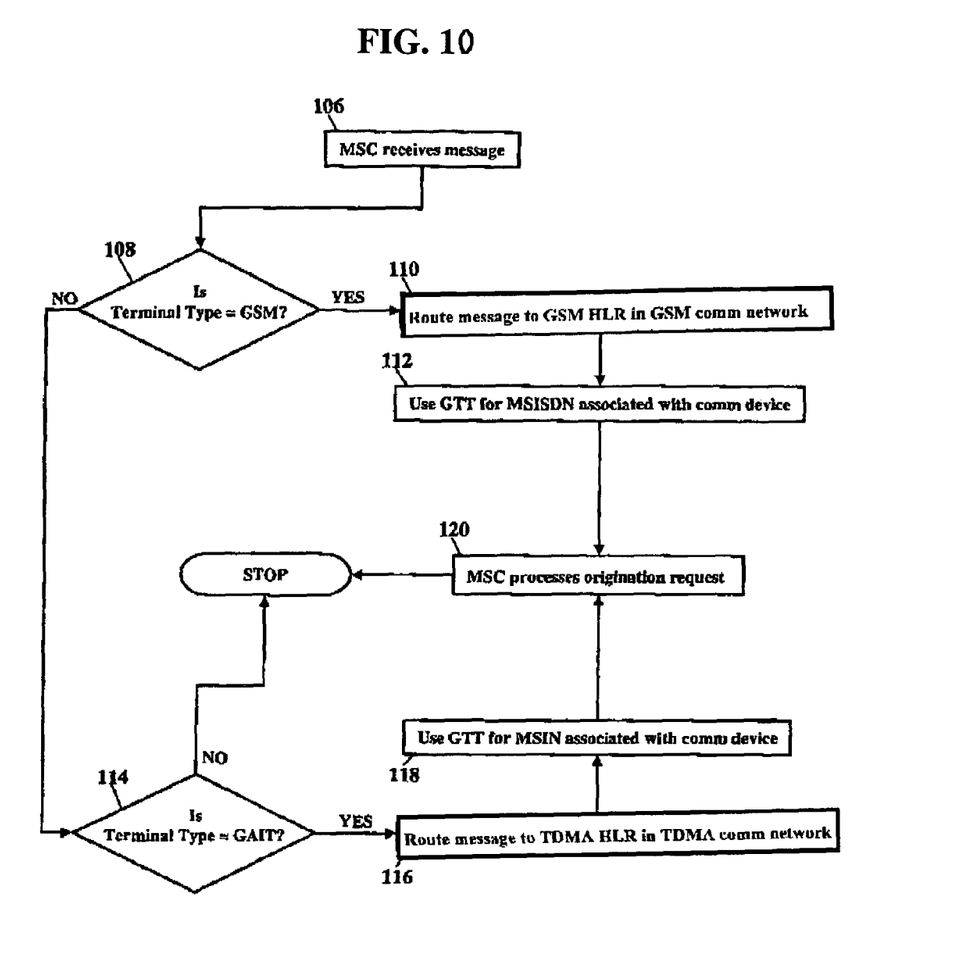
FIG. 10 is a flowchart illustrating still another method for delivering a message to a communications device.

FIG. 10 is a flowchart illustrating yet another method for delivering a message to a communications device. Here a communication (MSC) receives a message (Block 106), and the message is to terminate at a communications device. If a Terminal Type of the communications device is Global System for Mobile (GSM) communications (Block 108), then the message is routed to a GSM Home Location Register (HLR) operating in a Global System for Mobile communications network (Block 110). The routing of the message uses global title translation (GTT) for a Mobile Station Integrated Services Digital Network (MSISDN) associated with the communications device (Block 112). If the Terminal Type of communications device is GSM-ANSI Interoperability Team (GAIT) (Block 114), then the message is routed to a TDMA Home Location Register (HLR) in a Time Division Multiple Access (TDMA) communications network (Block 116). The routing of the message uses Global Title Translation (GTT) for a Mobile Subscriber Identification Number (MSIN) associated with the communications device (Block 118). The message is processed for termination at the communications device (Block 120).

While this invention has been described with respect to various features, aspects, and embodiments, those skilled and unskilled in the art will recognize the invention is not so limited. For example, while this invention discusses short messages, the methods could similarly be applied to other messaging services and content delivery. Other variations, modifications, and alternative embodiments may be made without departing from the spirit and scope of this invention.

What is claimed is:

1. A method, comprising the steps of:
    migrating a communications device to a Global System for Mobile communications network, the communications device migrated from at least one of a Time Division Multiple Access communications network and a Code Division Multiple access communications network;
    receiving an origination request from the communications device, the origination request for sending a message from the communications device, the origination request comprising a network address of a message service center serving the communications device;
    receiving the message at a base station, the message proceeded by the origination request, forwarding the message to a mobile switching center and then to a Signaling Transfer Point, the Signaling Transfer Point associated with a signaling system 7 signaling point code;
    locating the message service center by associating the network address to the signaling system 7 signaling point code, the signaling point code identifying the message service center in the Global System for Mobile communications network;
    replacing the network address of the origination request with the signaling point code; and
    routing the origination request and message to the message service center operating in the Global System for Mobile communications network, wherein the origination request is processed by the message service center.

2. A method according to claim 1, further comprising the step of updating the network address after migration of the communications device, wherein the network address identifies the message service center in the Global System for Mobile communications network.

3. A method according to claim 1, further comprising the step of wirelessly updating the network address after migration of the communications device, wherein the network address identifies the message service center in the Global System for Mobile communications network.

4. A method according to claim 1, wherein the step of receiving the origination request comprises receiving the originating request at a mobile switching center in the Global System for Mobile communications network.

5. A method according to claim 1, wherein the step of associating the network address to the signaling point code is performed by the Signaling Transfer Point in the Global System for mobile communications network.

6. A method according to claim 1 further comprising the step of associating the network address to the signaling point code, the signaling point code identifying the signaling interface between the Global System for Mobile communications network and at least one of the Time Division Multiple Access communications network and the Code Division Multiple Access communications network.

7. A method according to claim 1, further comprising the step of wirelessly changing the network address after migration of a subscription profile associated with the communications device, wherein the network address identifies the message service center in the Global System for Mobile communications network.

8. A method, comprising the steps of:
    receiving a message and a termination request at a message service center, the message terminating at a dual mode GSM-ANSI Interoperability team (GAIT) communications device;
    determining a Terminal Type of the GAIT communications device;
    validating the GAIT communications device by the message service center;
    if a subscription profile associated with the GAIT communications device has been re-provisioned in the message service center and the Terminal Type of the GAIT communications device is Global System for Mobile communications, then routing the message and the termination request using a GSM Home Location Register operating in a Global System for Mobile communications network, the routing of the message using a signal transfer point performing a global title translation for a Mobile Station Integration Services Digital Network number associated with the GAIT communications device, the message and termination request being processed by the GSM Home Location Register for termination at the GAIT communications device; and
    if the subscription profile associated with the GAIT communications device remains provisioned in the message service center and the Terminal Type of GAIT communications device is GSM-ANSI Interoperability Team, then routing the message and the termination request using a TDMA Home Location Register in a Time Division Multiple Access communications network, the routing of the message using a signal transfer point performing a global title translation for a Mobile Subscriber Identification Number associated with the GAIT communications device, the message and termination request being processed by the TDMA Home Location Register for termination at the GAIT communications device.

* * * * *